(No Model.) 2 Sheets—Sheet 2.
J. H. HARRIS.
ICE CREAM FREEZER.
No. 463,709. Patented Nov. 24, 1891.
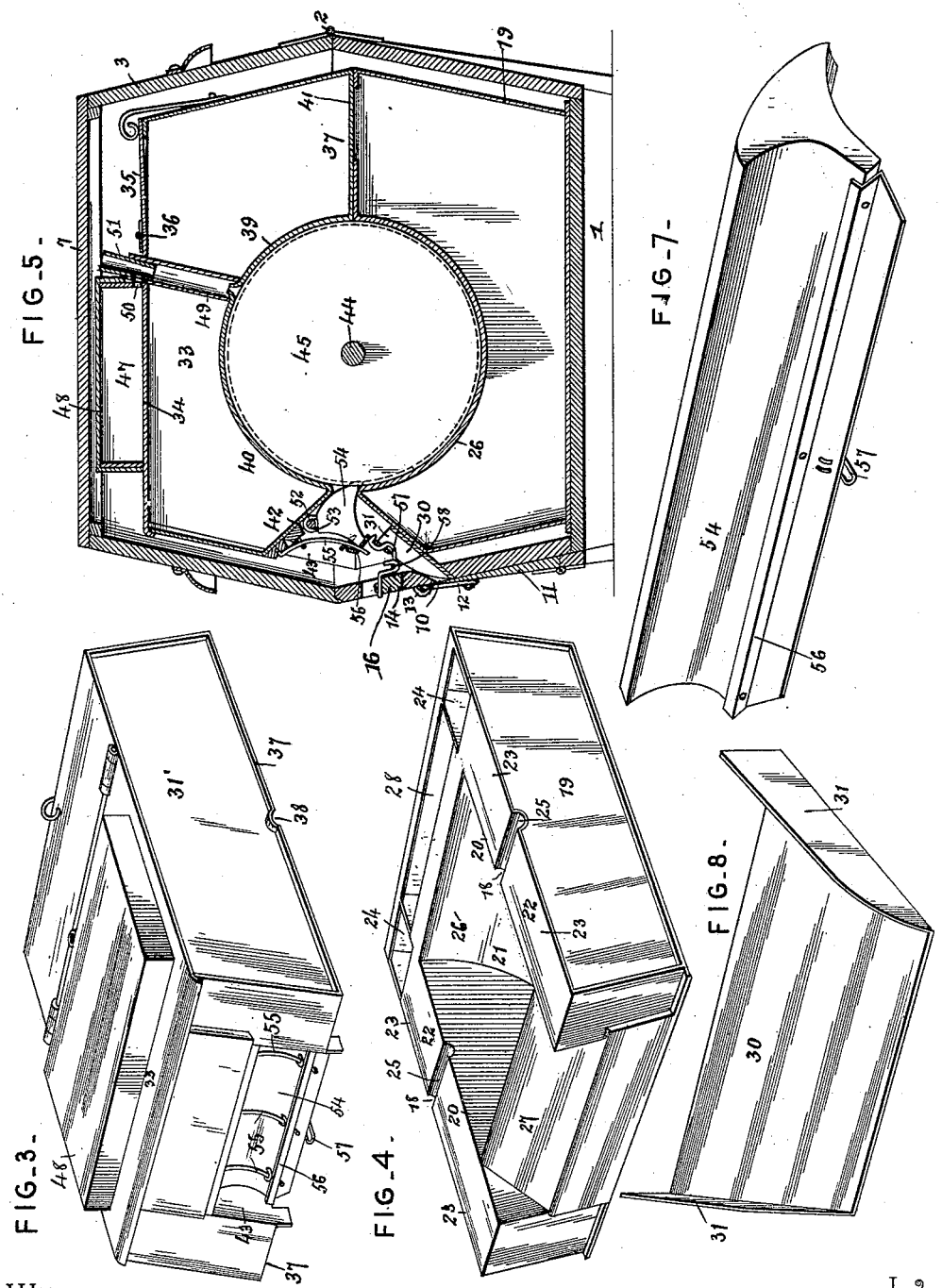
Witnesses:
Jas. K. McLathran
W. S. Duvall
Inventor
John H. Harris
By his Attorneys,
C. A. Snow & Co.

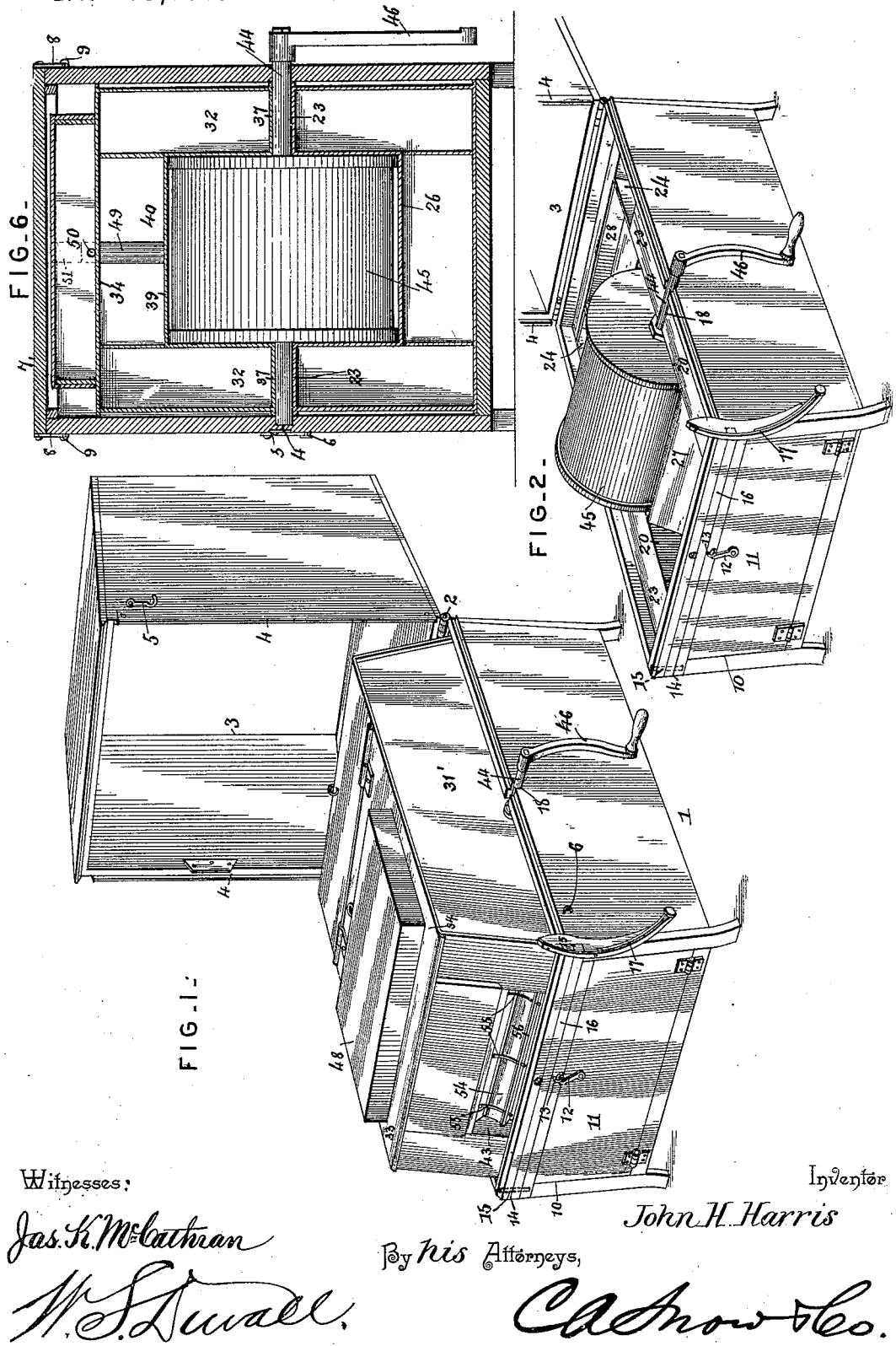

UNITED STATES PATENT OFFICE.

JOHN H. HARRIS, OF IOLA, KANSAS.

ICE-CREAM FREEZER.

SPECIFICATION forming part of Letters Patent No. 463,709, dated November 24, 1891.

Application filed April 9, 1891. Serial No. 388,256. (No model.)

*To all whom it may concern:*

Be it known that I, JOHN H. HARRIS, a citizen of the United States, residing at Iola, in the county of Allen and State of Kansas, have invented a new and useful Ice-Cream Freezer, of which the following is a specification.

This invention relates to improvements in that class of ice-cream freezers employing a rotatable cylinder, to which the cream adheres and is frozen during such rotation and delivered in a thin sheet into a receptacle awaiting its reception.

The objects of the present invention are to provide a cheap and simple construction of freezer of the above class capable of facilitating the freezing of the cream or other substance, and that more thoroughly, which is easy of access and manipulation, may be stored with and emptied of the refrigerative agent, and may be more readily cleaned and better adapted for feeding the cream to the cylinder and receiving the same.

With the above objects in view the invention consists in certain features of construction hereinafter specified, and particularly pointed out in the claims.

Referring to the drawings, Figure 1 is a perspective of an ice-cream freezer contructed in accordance with my invention, the cover thrown back, exposing the interior. Fig. 2 is a similar view, the upper freezing-section being removed. Figs. 3 and 4 are details in perspective of the upper and lower freezing-sections, respectively. Fig. 5 is a vertical longitudinal section. Fig. 6 is a transverse section. Fig. 7 is a detail in perspective of the scraping-blade. Fig. 8 is a detail in perspective of the delivery-pan.

Like numerals of reference indicate like parts in all the figures of the drawings.

In practicing my invention I employ a rectangular box or casing 1, to the rear edge of which I hinge, as at 2, a rectangular cover 3, having a shape similar to the casing 1 and having its edges provided with overlapping strips 4. The cover is secured upon the casing in this instance by hooks 5, which removably engage with eyes 6 upon the casing. A lid 7 is mounted upon the cover, is removable, and is secured in position by a pair of hooks 8, engaging with eyes 9 upon the cover. At its front end the casing is provided with a transverse opening 10, covered by a swinging hinged lid or flap 11, which may be fastened in position by a hook 12, engaging with an eye 13. A recess 14 is formed in the front face of the casing 1 parallel to and near the upper edge thereof, and pivoted therein, as at 15, is a bar 16, which extends beyond the opposite side of the casing 1 and is connected to the upper end of a spring 17, the lower end of which is made fast to the side of the casing. The opposite sides of the casing, at their upper edges, are provided with bearings 18, for a purpose hereinafter apparent.

Removably mounted in and approximating the shape and size of the casing 1 is a sheet-metal box 19, which by a pair of longitudinal partitions 20, located near the opposite sides of the box, is divided into a central compartment 21 and two side compartments 22, somewhat narrower than the central compartment. The side compartments are covered partially by covers 23, which extend to near the rear ends of the compartments, but leave openings 24, through which the refrigerating agent may be introduced. The covers 23 are also provided in line with the bearings 18 of the casing with half bearing-grooves 25. The central compartment 21 is provided with a concaved cover 26, semi-cylindrical in cross-section, concentric with the bearing-grooves 25, and beyond its concavity at its front is inclined to form a wall 27 and in rear of the concavity extended over the compartment a slight distance, leaving an opening 28 in the rear end of the said compartment, through which the refrigerative material may be introduced. The inclined wall 27 is in line with or leads to the opening 10 of the casing and is continued by means of a removable delivery pan or tray 30, having its opposite edges converged and provided with flanges 31. The flanges rest against the opposite edges of the opening, and hence form a continuation of the inclined wall 27.

31' designates the upper freezing box or section, and the same consists of the three compartments—namely, the central compartment 33 and the two outer compartments 32. These compartments are partially covered by a common top 34, to which is hinged, as at 36, a lid 35 for closing the compartments. The bottoms 37 of the side compartments, which have contact with the tops of the corresponding compartments of the lower refrigerating-section, are provided with transverse half-cylindrical bearing-grooves 38, which are opposite the grooves 25 of the lower section. The bottom 39 of the central compartment of the upper section is concaved at its center, as at 40, so as to be semi-cylindrical in cross-section, and in rear of its curved portion is extended to complete the bottom, as at 41, and in front of the same upwardly inclined, as at 42, so as to combine with the inner side walls of the side compartments of the upper section to form a recess 43. After the lower section has been placed in position the shaft 44, upon which is mounted a cylinder 45, is mounted in the bearings 18 and those of the meeting faces in the refrigerating-sections, said shaft being rotatable by means of a crank 46, located outside of the casing. The upper refrigerating-section is now placed in position, it being of course understood that the two have been previously filled with a proper refrigerating agent, the cold air radiating from the sections to the cylinder. A cream-pan 47 receives the cream when first introduced into the apparatus and is located conveniently upon the top of the upper refrigerating-section, and access may be had by the removal of a cover 48 and the cover 7 of the casing. A pipe 49 leads from one edge of the cream-pan and the top of the upper refrigerating-section to the concaved portion of the bottom of said section. The pipe communicates at its upper end with the cream-pan by a port 50, which may be closed by a nozzle 51, located outside of the pan and inserted in the pipe. Cream may also be introduced directly through the nozzle when desirable. It will be observed that the cream, being fed to the top of the cylinder, will be frozen by contact therewith and from exposure to the cold surfaces of the refrigerating-sections during the rotations of the cylinder, so that the cream is frozen upon the surface of the cylinder. It now simply remains to provide a means for delivering the cream from the cylinder to the receptacle placed for the reception of the same. In the recess 43, at the front end of the upper section, I secure a shaft 52, and by eyes 53 hinge to the shaft a triangular scraping-blade 54, which is spring-pressed by a series of springs 55 into contact at its rear edge with the periphery of the cylinder. The opposite edge is provided with a metal strip 56, and to the same is connected an eye 57, which engages removably with a hook 58, extending rearwardly from the inner face of the pivoted bar 16. The object of this bar, spring-pressed inwardly, as heretofore described, is to permit of the operator pressing against the spring in a direction contrary to its tendency, and thus forcing the bar out from the casing and withdrawing the scraping-blade from the surface of the cylinder. This permits of the operator giving the cylinder a few rotations, so as to thoroughly cool the same previous to the beginning of the delivery of the cream. When sufficiently cooled, the bar is released and the scraper returned to position in contact with the periphery of the cylinder.

The cylinder consists of opposite circular wooden heads and an intermediate metal periphery, the heads being slightly larger in diameter than is the periphery, and thus projecting a slight distance beyond said periphery and leaving a space between the curved bottom and top of the upper and lower refrigerating-sections, respectively, and the surface of the cylinder.

Having described my invention, what I claim is—

1. In an ice-cream freezer, the combination, with the casing and the upper and lower freezing-sections, the adjacent walls of which are provided with semi-cylindrical concavities, of a shaft journaled in the casing, a cylinder on the shaft within the concavities, a scraper-blade located against the cylinder, a cream-receiving pan located upon the upper refrigerating or freezing section, a feed-tube leading from a point above the section through the same, terminating in the upper concavity above the cylinder, and having a port effecting communication between the pan and pipe, and a nozzle removably inserted in the upper end of the pipe and adapted to close the port, substantially as specified.

2. In an ice-cream freezer, the combination, with the casing, a lever pivoted at one end to one corner of the casing, and a spring for pressing the lever toward the casing, of upper and lower freezing-sections having concaved meeting walls provided at corresponding ends with recesses, a delivery-pan located in one of the recesses, a shaft in the remaining recess, a scraper-blade loosely hung upon the shaft, a spring for pressing the blade into contact with the cylinder, and connections between said blade and lever, substantially as specified.

3. In an ice-cream freezer, the combination, with the rectangular casing, the lower freezing-section mounted in the casing, a pair of longitudinal walls dividing said section into two outer compartments and a central compartment, coverings for the compartments terminating short of the walls of the section and leaving openings, the cover of the central compartment being concaved between its ends and at its front end inclined and communicating with an opening formed in the front wall of the casing, a shaft journaled in bearings formed in the walls of the casing, and a cylinder mounted on the shaft and rotating in the concaved cover of said lower section, of a cover hinged to the edge of the casing and provided at its upper end with a removable lid, an upper freezing section or box mounted upon the lower section and provided with a pair of divisional partitions forming two outer compartments and a central compartment, the bottom of the latter being concaved or semi-cylindrical to receive the cylinder and in front of its circular portion being inclined to form a recess between the two inner walls of the side compartments, a shaft therein, a scraper-blade spring-pressed and loosely mounted on the shaft and having contact with the periphery of the cylinder, a cover for said upper section terminating short of one wall of the section, a hinged lid forming a continuation of the cover, a pan mounted upon said upper section, and a pipe leading from the pan to the concavity of said upper section and to a point above the cylinder, substantially as specified.

In testimony that I claim the foregoing as my own I have hereto affixed my signature in presence of two witnesses.

JOHN H. HARRIS.

Witnesses:
H. A. EWING,
M. P. JACOBY.